Aug. 29, 1944.  C. S. WEYANDT  2,356,961
VIBRATORY ELECTRIC MOTOR
Filed July 17, 1942  2 Sheets—Sheet 1
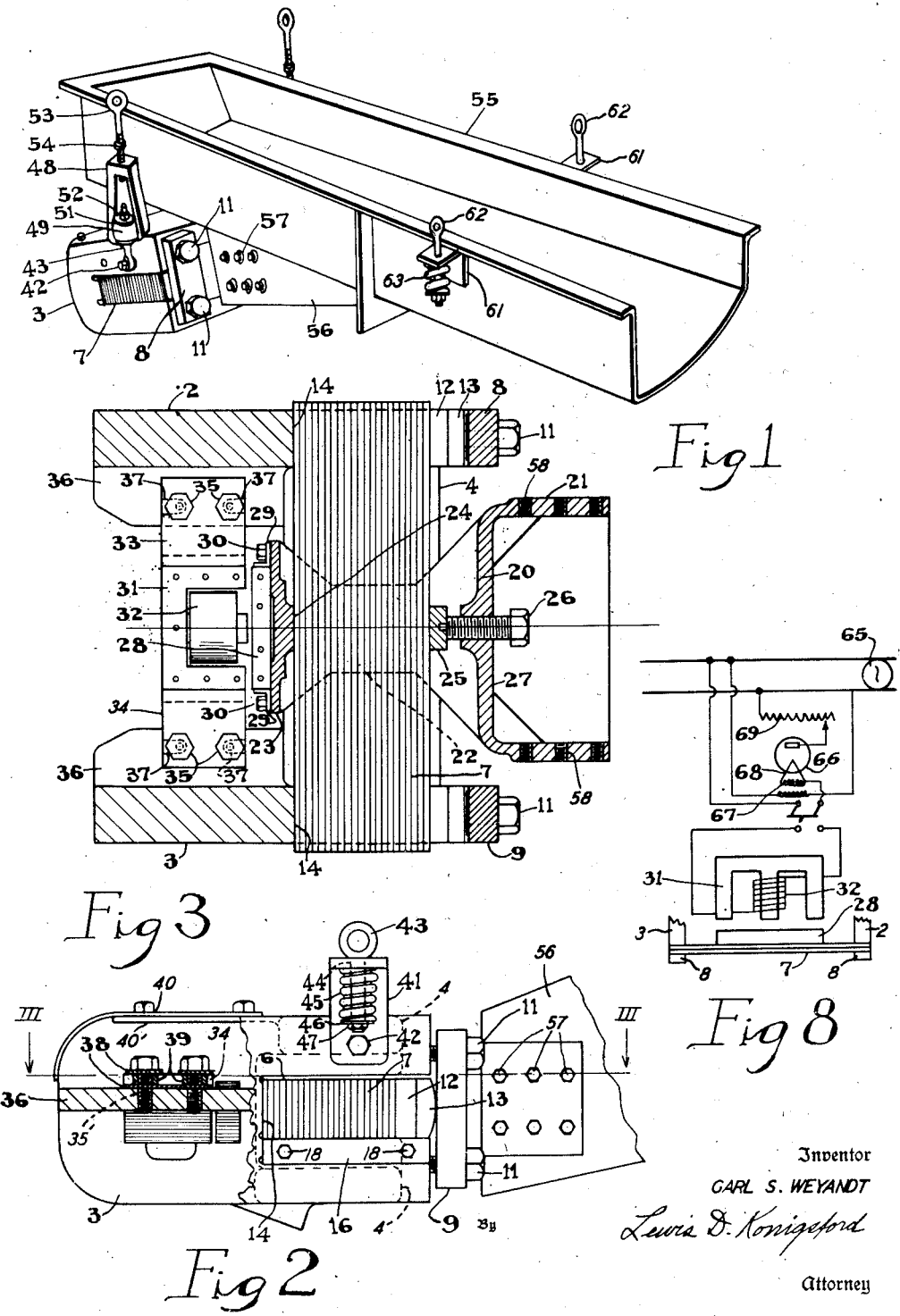
Inventor
CARL S. WEYANDT
Lewis D. Konigsford
Attorney Aug. 29, 1944.   C. S. WEYANDT   2,356,961
VIBRATORY ELECTRIC MOTOR
Filed July 17, 1942   2 Sheets-Sheet 2

Inventor
CARL S. WEYANDT
Lewis D. Konigsford
Attorney

Patented Aug. 29, 1944

2,356,961

UNITED STATES PATENT OFFICE 2,356,961

VIBRATORY ELECTRIC MOTOR

Carl S. Weyandt, Homer City, Pa.

Application July 17, 1942, Serial No. 451,265

15 Claims. (Cl. 172—126)

This invention relates to vibrating or reciprocating electric motors and relates particularly to such motors applicable for vibrating conveyor troughs or the like.

One object of the invention is the provision of a vibratory motor wherein the air gap between the armature and electromagnet is readily adjustable.

Another object is the provision of a vibratory motor which may be readily disassembled for inspection and repair.

A further object is the provision of a vibratory motor which efficiently transmits vibrations to the object to be vibrated.

A further object is the provision of a vibratory motor of the bar spring type wherein the springs and armature assembly may readily be disconnected from the base or object to be vibrated for replacement or repair.

Still another object is the provision of a vibratory motor of simple construction of relatively few parts that is easily disassembled, and may be tuned for a variety of purposes.

Figures 6, 7:
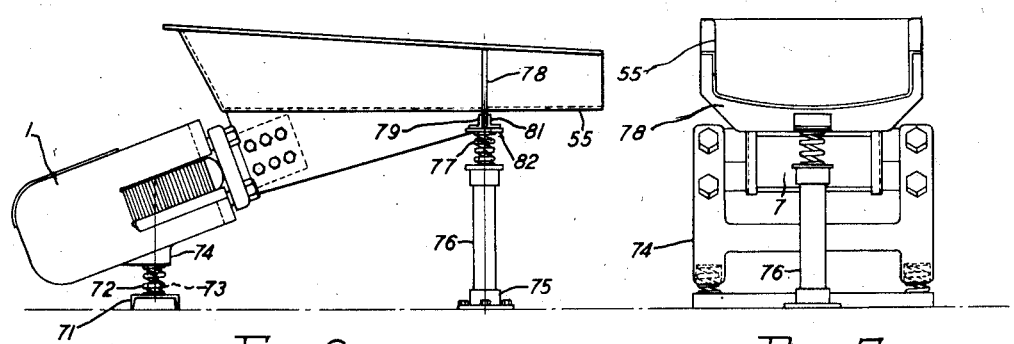
Figure 4:
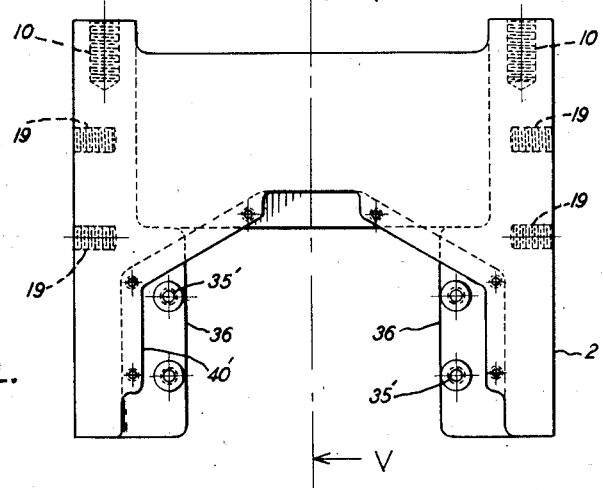
Figure 5:
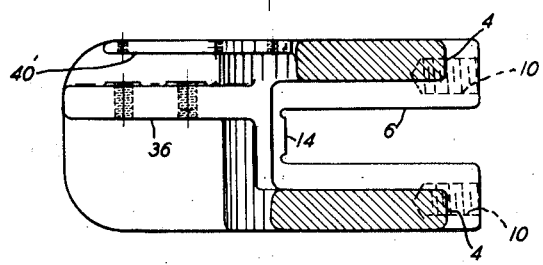

These and other objects will be apparent from consideration of the following specification taken in connection with the accompanying drawings, wherein is shown preferred embodiments of the invention by way of example, and wherein:

Figure 1 is a perspective view of a conveyor embodying my invention,

Figure 2 is a side view on an enlarged scale partly in section of the vibratory motor of Figure 1, Figure 3 is a section taken on line III—III of Figure 2, Figure 4 is a top view of the motor frame, Figure 5 is a section taken on line V—V of Figure 4, Figure 6 is a side elevation of a modification adapted to be supported from a base, Figure 7 is an end view of Figure 6, and Figure 8 is a wiring diagram showing a preferred mode of operation of the apparatus.

Referring to the drawings, there is shown a motor frame 1 comprising two C-shaped side portions 2 and 3 connected together by spaced webs or flanges 4 and providing a middle open portion between the side portions. The open-ended slots 6 of the C are adapted to receive a plurality of substantially flat or bar springs 7 extending therethrough. Clamping bars 8 and 9 are secured to the forward end of the frame by bolts 11 threaded into holes 10 and press the spacer blocks 12 and 13 against the springs at their ends to clamp them in place against the end walls 14 of the slots. Aligning plates 16 are secured by bolts 18 threaded into holes 19 in the lower portion of the frame to align the lower edges of the stack of spring bars. The number of leaf or bar springs employed will depend on the body or object to be vibrated and less leafs than that shown may be used by employing additional filler blocks like blocks 12.

The armature structure comprises a casting 20 provided with a yoke or the like 21 at one end, and side portions 22 integral therewith and joined at their opposite ends by an integral base portion 23. A pad or boss 24 is provided on the base portion 23 and the armature structure is clamped to the middle of bar springs 7 between pad 24 and a swivelled clamping block 25 pressed into clamping engagement by a clamping screw 26 threaded through a wall 27 of the yoke portion. The armature 28 preferably comprises a plurality of laminations of soft iron or the like riveted or otherwise secured together, and secured to angle bars 29 at the ends by welding or in any other desirable manner. The armature is secured to the armature base portion by screws 30 passing through the angle bars 29 into the base.

The electromagnet 31 is in the general shape of an E with a coil 32 wound about the middle leg. It is composed of a plurality of laminations of soft iron or other metal of low retentivity secured together by rivets or the like, and welded to angle plates 33 and 34 which preferably are non-magnetic and which are bolted by bolts 35 threaded into holes 35' in the internal ribs 36. Angle plates 33 and 34 are slotted as indicated at 37 to receive the bolts 35 so as to allow adjustment of the electromagnet structure to or from the armature, and insulating washers 38 and insulating sleeves 39 are interposed to insulate the plates 33 and 34 from the motor frame to prevent induced currents. A cover 40 is provided for the electromagnet, which is secured to flanges 40' extending from the side members and merging with webs 4.

Angle plates 41 (Figure 2) are swivelly secured by bolts 42 to the sides of the motor frame and an eye bar 43 passes through a suitable hole 44 in the plate and through a spring 45, a washer 46 and nut 47 preventing withdrawal of the eye bar. In the modification shown in Figure 1, the eye bar is swivelly secured to the motor frame directly by a bolt 42 and passes through a stirrup 48 and a pad 49 of rubber or similar elastic material held in place by a washer 51 and nut 52. A screw eye 53 is threaded into the stirrup and may be locked in adjusted position by a lock nut 54. As shown in Figure 1, a conveyor trough 55 has a depending apron or flange 56 which is bolted to the yoke by bolts 57 threaded into holes 58 in the yoke. Angle plates 61 are welded or otherwise suitably secured to the trough and have eye bolts or bars 62 passing therethrough and through cushioning springs 63. It will be understood that in place of the conveyor trough 55 any other suitable apparatus or device may be secured to the armature structure.

In operation, the motor frame and conveyor are suspended by cables, rods or other suitable means from an overhead support, pliable cables being preferred for this purpose to reduce the transmission of vibrations to the support, this being assisted by the resilient members 45 or 49 and 63. The electromagnet is actuated by alternating current, intermittent undulating current or other suitable type of current to produce a pulsating or alternating magnetic field.

Referring to Figure 8, wherein a wiring diagram of the preferred mode of operation is illustrated, 65 represents a source of alternating current, which may be, for example, a commercial wiring outlet of suitable frequency, and 66 is a rectifier which is shown as a vacuum tube, but which may be a dry disc type or any other type. A transformer 67 provides heating current for the filament 68, and a rheostat 69 in the plate circuit or in any other suitable location controls the current supplied to the coil 32 of the motor. Suitable switches are provided for heating the filament before connecting the motor into the circuit. The springs 7, together with the armature structure and attached apparatus, are suitably tuned close to resonance to vibrate under the influence of the magnetic field. Preferably, the weight of the stationary parts, which, in the modification shown includes the motor frame 1, and electromagnet 31, etc., is at least two times the weight of the unloaded vibratory parts, and may, under certain conditions, be three times or more that of the vibratory parts. For example, when operating at 3000 or 3600 vibrations a minute from a 50 cycle or 60 cycle source of alternating current respectively, I prefer to have the stationary parts about twice the mass of the vibratory parts, whereas, when operating at 1800 vibrations a minute from a 30 cycle source of alternating current, I prefer to have the stationary parts at least three times the mass of the vibratory parts. This structure has the advantage that in case of breakage of a spring leaf or other part, the conveyor trough may be supported by a sling, the bolts 26 and 11 released and the broken springs removed from the motor frame and a new spring inserted. The bolts 11 and 26 then are tightened, the sling removed and the apparatus is again ready for operation. Also, if desired, the armature assembly and leaf springs may be removed from the motor frame by releasing bolts 57 and the bolts 11 and removing clamping plates 8. This structure also has the advantage that a massive base may be provided in a relatively small volume or space.

In the modification shown in Figures 6 and 7, a base 71, shown as an inverted channel bar, supports helical springs 72, which are held in position about lugs 73 welded or otherwise secured to the channel bar. The motor frame 1 has extensions or bosses 74 which rest on the springs to support the motor. At the forward end a flanged socket 75, which may be bolted down, receives a post 76, which at its upper end carries a spring 77. A flange 78 is welded or otherwise secured to the conveyor trough and angle plates 79 and 81 welded to the flange 78 and to a plate 82 provide a rest by which the conveyor trough is supported by spring 77. Suitable bosses extending from boss 74 and plate 82 and post 76 center the springs 72 and 77, and thus a resilient three point support is provided.

Various modifications may be made in the invention without departing from the spirit or scope thereof.

What I claim as my invention and desire to secure by United States Letters Patent is:

1. In a vibrating motor, a plurality of leaf springs, an armature structure clamped to the middle of said springs and carrying an armature, a massive motor frame providing spaced open-ended slots to receive the ends of said springs, removable means closing the ends of said slots and clamping said spring ends against the base of said slots whereby said spring and armature structure are readily removable, and an electromagnet carried by said frame adjacent said armature.

2. In a vibratory motor, a massive motor frame providing spaced open-ended slots, suspension means resiliently secured to said frame, a plurality of bar springs stacked in said slots and extending transversely thereof, clamping blocks in said slots each having a curved outer surface, clamping bars engaging said blocks to clamp said springs against the base of said slots, and electromagnet carried by said frame, an armature structure carrying an armature clamped to the middle of said springs, and an object to be vibrated secured to said armature structure.

3. In a vibratory motor, a motor frame in the general form of an H having bifurcated legs to provide open-ended slots, a plurality of leaf springs stacked in said slots and extending transversely thereof, clamping bars clamping the ends of said springs between said bar and the base of said slots, an armature structure comprising a yoke member having side portions united by a base and clamping means for securing said springs between said base and said clamping means, an armature carried by said base, an electromagnet carried by said frame adjacent said armature, and suspension means secured to said motor frame.

4. In a vibrating motor, a plurality of leaf springs, an armature structure clamped to the middle of said springs and carrying an armature, a massive motor frame providing spaced open-ended slots to receive the ends of said springs, removable means closing the ends of said slots and clamping said spring ends against the base of said slots, whereby said spring and armature structure are readily removable, and an electromagnet carried by said frame adjacent said armature, and suspension means secured to the motor frame.

5. In a vibrating motor, a plurality of leaf springs, an armature structure clamped to the middle of said springs and carrying an armature, a massive motor frame providing spaced open-ended slots to receive the ends of said springs, removable means closing the ends of said slots and clamping said spring ends against the base of said slots, whereby said spring and armature structure are readily removable, and an electromagnet adjustably carried by said frame adjacent said armature.

6. In a vibrating motor, a plurality of leaf springs, an armature structure clamped to the middle of said springs and carrying an armature, a massive motor frame providing spaced open-ended slots to receive the ends of said springs, removable means closing the ends of said slots and clamping said spring ends against the base of said slots, whereby said spring and armature structure are readily removable, said motor frame providing flanges, angle bars adjustably secured to said flanges, and an electromagnet secured to said angle bars.

7. In a vibratory motor, a motor frame in the general form of an H having bifurcated legs to provide open-ended slots, a plurality of leaf springs stacked in said slots and extending transversely thereof, clamping bars clamping the ends of said springs between said bar and the base of said slots, an armature structure comprising a yoke member having side portions united by a base and clamping means for securing said springs between said base and said clamping means, an armature carried by said base, an electromagnet carried by said frame adjacent said armature by means of angle plates secured to said electromagnet and adjustably bolted to said frame, suspension means secured to said motor frame, and a conveyor trough secured to said yoke.

8. In a vibratory motor, a motor frame in the general form of an H having bifurcated legs to provide open ended slots, a plurality of leaf springs stacked in said slots and extending transversely thereof, clamping bars clamping the ends of said springs between said bar and the base of said slots, an armature structure comprising a yoke member having side portions united by a base, a clamping bolt extending through said yoke member for securing said springs between said base and said yoke, an armature carried by said base, an electromagnet carried by said frame adjacent said armature, suspension means secured to said motor frame, and a conveyor trough having an apron secured to said yoke.

9. In a vibrating motor a plurality of leaf springs, an armature structure clamped to the middle of said springs and carrying an armature adapted to be vibrated, a relatively fixed motor frame providing spaced open ended slotted portions joined by webs, said slots being adapted to receive the ends of said springs, removable means clamping said springs against the base of said slots, an electromagnet secured to said frame, the relatively fixed parts of said motor being at least two times the mass of the vibratory parts, and means for developing a pulsating electromagnet field in the electromagnet.

10. In a vibratory motor, a relatively fixed motor frame providing spaced open-ended slots, a plurality of bar springs stacked in said slots, and extending transversely thereof, removable means secured across the ends of said slots and clamping said spring ends against the base of said slots, an armature structure clamped to the middle of said springs and adapted to be vibrated, an electromagnet secured to said frame, and means supplying substantially spaced current impulses to said electromagnet for vibrating said armature structure, the mass of the relatively fixed portion of the motor being at least twice that of the vibratory structure.

11. In a vibratory motor, a relatively fixed motor frame providing spaced open ended slots, a plurality of bar springs stacked in said slots, and extending transversely thereof, removable means secured across the ends of said slots and clamping said spring ends against the base of said slots, an armature structure clamped to the middle of said springs and adapted to be vibrated, an electromagnet secured to said frame, and means supplying substantially spaced current impulses to said electromagnet for vibrating said armature structure.

12. A vibratory conveyor comprising a relatively fixed motor frame providing spaced open ended slots, a plurality of bar springs stacked in said slots and extending transversely thereof, removable means secured across the ends of said slots and clamping said spring ends against the base of said slots, an armature structure clamped to the middle of said springs comprising a yoke portion, a conveyor trough having a depending apron secured to said yoke portion, an armature secured to the armature structure, and an electromagnet secured to said frame.

13. A vibratory conveyor comprising a relatively fixed motor frame providing spaced open ended slots, a plurality of bar springs stacked in said slots and extending transversely thereof, removable means secured across the ends of said slots and clamping said spring ends against the base of said slots, an armature structure clamped to the middle of said springs comprising a yoke portion, a conveyor trough having a depending apron secured to said yoke portion, an armature secured to the armature structure, an electromagnet secured to said frame, and means resiliently supporting said motor and conveyor trough.

14. In a vibratory motor, a relatively fixed motor frame providing spaced open ended slots, a plurality of bar springs stacked in said slots and extending transversely thereof, removable means secured across the ends of said slots and clamping said spring ends against the base of said slots, an armature structure clamped to the middle of said springs and adapted to be vibrated, an electromagnet secured to said frame, a source of alternating current having a frequency of at least 50 cycles per second and a rectifier connected to said alternating current source and to said electromagnet to supply substantially spaced current impulses thereto for vibrating the armature structure at at least 3000 vibrations per minute, the mass of the relatively fixed portion of the motor being at least twice that of the vibratory structure.

15. In a vibrating motor, a plurality of leaf springs, an armature structure clamped to the middle of said springs and carrying an armature, a motor frame providing spaced open ended slots to receive the ends of said springs, adjustable means engaging the sides of said springs for aligning the same, removable means closing the ends of said slots and clamping said spring ends against the base of said slots whereby said spring and armature structure are readily removable, and an electromagnet carried by said frame adjacent said armature.

CARL S. WEYANDT.